United States Patent [19]

Allen et al.

[11] Patent Number: 5,710,466
[45] Date of Patent: Jan. 20, 1998

[54] FULLY INTEGRATED MAGNETIC MICROMOTORS AND METHODS FOR THEIR FABRICATION

[75] Inventors: Mark G. Allen, Atlanta, Ga.; Chong-Hyuk Ahn, Cincinnati, Ohio

[73] Assignee: Georgia Tech Research Corporation, Atlanta, Ga.

[21] Appl. No.: 492,323

[22] Filed: Jun. 19, 1995

[51] Int. Cl.$^6$ ........................................ H02K 7/00
[52] U.S. Cl. ........................ 310/40 MM; 310/67 R; 310/68 R
[58] Field of Search ..................... 310/40 MM, 67 R, 310/68 R

[56] References Cited

U.S. PATENT DOCUMENTS

| | | | |
|---|---|---|---|
| 4,728,835 | 3/1988 | Baines | 310/71 |
| 4,740,410 | 4/1988 | Muller et al. | 428/133 |
| 4,755,699 | 7/1988 | Schmider | 310/68 R |
| 4,943,750 | 7/1990 | Howe et al. | 310/309 |
| 5,013,954 | 5/1991 | Shibaike et al. | 310/309 |
| 5,015,906 | 5/1991 | Cho et al. | 310/309 |
| 5,043,043 | 8/1991 | Howe et al. | 156/645 |
| 5,093,594 | 3/1992 | Mehregany | 310/82 |
| 5,113,100 | 5/1992 | Taghezout | 310/40 |
| 5,206,983 | 5/1993 | Guckel et al. | 29/598 |
| 5,245,193 | 9/1993 | Nakanishi | 250/492.2 |
| 5,252,881 | 10/1993 | Muller et al. | 310/309 |
| 5,428,259 | 6/1995 | Suzuki | 310/309 |

OTHER PUBLICATIONS

Ahn et al., "A Planar Variable Reluctace Magnetic Micromotor With Fully Integrated Stator And Wrapped Coils", IEEE Catalog No. 93CH32665-6, Feb. 7-10, 1993, pp. 1-5.

Primary Examiner—Steven L. Stephan
Assistant Examiner—Elvin G. Enad
Attorney, Agent, or Firm—Thomas, Kayden, Horstemeyer & Risley

[57] ABSTRACT

A planar fully integrated variable reluctance micromotor (10) is microfabricated on a substrate base (18). The micromotor includes a pin (19), rotor (12) with radially extending poles (16), and a stator (20) having a plurality of poles (21) configured in pairs (22) circumferentially spaced about the rotor. The rotor is microfabricated in place, or in situ, contiguous to the substrate base. The pairs of stator poles include a multilevel core (26) wrapped around a meander conductor (27) which is connected to bonding pads (32). The variable reluctance micromotor is particularly adapted to operating as a micropump (45) for conductive fluids.

8 Claims, 6 Drawing Sheets

FULLY INTEGRATED MAGNETIC MICROMOTORS AND METHODS FOR THEIR FABRICATION

The U.S. Government has a paid-up license in this invention and the right in limited circumstances to require the patent owner to license others on reasonable terms as provided for by the terms of Contract No. E-21-603 awarded by the National Science Foundation.

FIELD OF THE INVENTION

The present invention generally relates to magnetic motors fabricated on a micro-scale, and more particularly, to fully integrated variable reluctance magnetic micromotors and methods for their fabrication.

BACKGROUND OF THE INVENTION

Microstructures are being used more and more in a variety of applications such as chemical processes, medical procedures, and space navigation systems. Several specific kinds of microstructures which are desirable in such applications are microvalves, micropumps, microsensors, and microfans. The development of these micromechanical structures requires comparably sized micromotors to drive these microstructures. However, the technology necessary to fabricate micromotors is in a state of infancy. A great amount of effort is presently being directed toward developing practical micromotors which can be fabricated using microfabrication techniques similar to those used in manufacturing semiconductors so that they can be economically produced on a mass scale in order to satisfy present demand. Unfortunately, the microscopic nature of these structures and motors makes the implementation of the simplest idea complex, tedious and time consuming, often resulting in a non-intuitive solution.

Various operating principles have been considered for micromotors such as electrostatic, ultrasonic, dielectric induction, and magnetic. Of the several proposed operating principles, electrostatic and magnetic drives have generally been favored.

Electrostatic micromotors operate by selectively applying a potential difference between a rotor and selected poles of a stator surrounding the rotor. As a result, the rotor poles closest to the charged stator poles of an opposite charge are pulled toward the stator pole causing the rotor to rotate. A limitation to the speed and rotational force of the electrostatic micromotor is the threshold voltage at which the electric field breaks down in the air gaps between the stator poles and rotor poles. This threshold voltage is controlled by a number of factors such as temperature, pressure and surface smoothness. Examples of electrostatic micromotors can be found in U.S. Pat. No. 5,252,881 to Muller et al., U.S. Pat. No. 4,943,750 to Howe et al., and U.S. Pat. No. 5,013,954 to Shibaike et al.

Magnetic micromotors generally fall into one of two categories, salient, meaning with poles, or non-salient, meaning without poles. The two types are most easily differentiated by the fact that variable reluctance magnetic micromotors usually include poles, while variable inductance micromotors usually do not include poles. Unlike electrostatic micromotors which are driven by voltage, magnetic micromotors are driven by magnetic flux typically generated by current flowing through an inductive component in accordance with Ampere's law. An example of magnetic a micromotor can be found in U.S. Pat. No. 5,113,100 to Taghezout.

Though not presently developed to the extent of electrostatic micromotors, magnetic micromotors have several advantages over electrostatic micromotors with regard to the environment in which the motors operate and the functions which they are capable of performing. For example, magnetic micromotors may be used in conductive fluids for bio-medical or chemical applications. Additionally, since magnetic micromotors usually require low driving voltages, the operation of magnetic micromotors is not inhibited by environments where high driving voltages are unacceptable or unattainable. Lastly, magnetic micromotors are often preferred over electrostatic micromotors because of their ability to achieve relatively high torques. Consequently, because of these advantages, magnetic micromotors are more attractive than electrostatic micromotors for many applications.

However, the development of a practical magnetic micromotor has been frustrated because of various difficulties encountered in their fabrication. Magnetic micromotors have previously been implemented by placing a permanent magnet rotor onto integrated planar coils and then introducing externally applied magnetic fields onto the assembled high-permeability moving parts, or by assembling electroplated rotors onto stators fabricated with wire-bonded coils. A reason that these approaches have been taken is due to the difficulty in fabricating three dimensional 'wrapped' coils using an integrated and planar fabrication process, as well as due to the lack of techniques to fabricate the rotor and the stator in a fully integrated fashion using electroplating techniques. However, recently a new three dimensional planar integrated meander-type inductive component has been proposed and demonstrated in Chong Ahn, Yong Kim and Mark Allen, "A Planar Variable Reluctance Magnetic Micromotor With Fully Integrated Stator and Wrapped Coils," IEEE Micro Electro Mechanical Systems Workshop, pp. 1–6, Fort Lauderdale, Fla., 1993, the disclosure of which is incorporated herein by reference, in which multilevel magnetic cores were 'wrapped' around planar meander conductors. This configuration can be thought of as the result of interchanging the roles of the conductor wire and magnetic core in a conventional inductor. With this integrated inductive component, it is possible to guide magnetic flux confined in an integrated magnetic core to the locations where magnetic actuation or sensing take place.

In further regard to the device disclosed in Ahn et al. are the structural configuration and fabrication technique utilized therein. Structurally, the rotor is spaced from the substrate base and positioned in the same plane as the top layer of the core. The rotor rests upon a pin bearing surface disposed on the pin support. In fabricating this micromotor, the rotor is first formed on a substrate separate from the pin and stator. The rotor is then released from the substrate and microassembled onto the pin. With this hybrid-assembled rotor, the micromotor achieves almost the smallest contact gap possible between the pin and rotor. Even though such optimal contact gap is achievable through the teachings of Ahn et al., the difficulties associated with microassembling the rotor onto the pin were not resolved. Thus, it would not be feasible to mass produce magnetic micromotors economically because of high production cost and manufacturing difficulties encountered with hybrid-assembling techniques.

Thus, it can be seen that it would be desirable to fully integrate the rotor and pin in manufacturing, eliminating the need to microassemble the rotor onto the pin. However, one of the difficulties in fabricating a fully integrated magnetic micromotor is how to produce a rotor of precise dimensions and having uniform gaps between the rotor poles and stator poles. The photolithography techniques used in forming fully integrated electrostatic micromotors are not directly applicable to magnetic micromotors for two reasons. First, electrostatic micromotors are thin film structures and magnetic micromotors are thick film structures. Secondly, electrostatic micromotors are planar structures with essentially all components in the same plane. In contrast, magnetic micromotors require multiple layers for construction of the multilevel wrapped coil. Therefore, to date, no known fully integrated magnetic micromotors have been developed.

SUMMARY OF THE INVENTION

An object of the present invention is to overcome the deficiencies and inadequacies in the prior art as described above and as generally known in the industry.

Another object of the present invention is to provide a planar fully integrated variable reluctance magnetic micromotor and method for fabricating the same.

Another object of the present invention is to provide a planar fully integrated variable reluctance magnetic micromotor which is inexpensive to manufacture, which is durable in structure, and which is efficient as well as reliable in operation.

Another object of the present invention is to provide a variable reluctance magnetic micromotor fabricated on a substrate base with the rotor contiguous with the substrate base so as to be suitable for operation as a micropump.

Broadly stated, the present invention is a fully integrated planar variable reluctance magnetic micromotor fabricated on a silicon wafer using surface micromachining techniques. The present invention discloses the use of polyamide as an integral structural material in the stator and as an electroplating form during the fabrication of the magnetic components. The micromotor comprises a silicon wafer as a substrate base upon which a pin, rotor, and stator are fabricated. The pin is centrally located and extends outwardly from the substrate base in a direction substantially normal thereto. The rotor includes a plurality of rotor poles extending radially from the rotor. Additionally, the rotor is fabricated in place, contiguous to the substrate base. The stator includes a plurality of stator poles arranged in pairs circumferentially about the rotor. Each pair of stator poles comprises a multilevel torodial core wrapped around a planar meander conductor, either end of the conductor being connected to bonding pads.

The present invention can also be viewed as a novel method for fabricating fully integrated variable reluctance micromotors. In this regard, the present invention involves the following method steps which are implemented with lithography and electroplating techniques though other suitable microfabrication techniques may be utilized. One step is providing a suitable substrate base upon which the micromotor is to be fabricated. Another step is to form a rotor supporter and a sacrificial layer thereover. Another step is etching the sacrificial layer to form electroplating forms for various structural components. Another step is to form a pin, a rotor, and a bottom core layer of the inductor. Another step is to form the meander conductor of the stator. Another step is to for the core via connections. Yet another step is to form the top core layer to complete the magnetic circuits. Finally, another step is the removal of the sacrificial layers, thereby freeing the rotor. Thus, by using lithography and electroplating techniques, the present invention can be fabricated using conventional photolithograph at a very low production cost.

In operation, the present invention is uniquely adapted to operating as a planar rotary micropump for pumping small amounts of fluids. Specifically, the positioning of the rotor of the micromotor contiguous the substrate base enables the micromotor to precisely control fluid flow. Moreover, the magnetic micromotor is driven by magnetic flux, thus allowing exposure of the rotor and stator to conductive fluids without consequence. Moreover, the speed and direction of the rotation of the rotor can be adjusted by changing the frequency and phase ruing order of the power supply respectively.

In addition to accomplishing the aforementioned objects, the present invention also has numerous advantages, a few of which are enumerated hereafter.

An advantage of the present invention is the fabrication of precise uniform gap separation between the rotor poles the stator poles as well as between the rotor and the pin. The precise gap control capability provides better operation stability as well as efficiency of the micromotor.

Another advantage of the present invention is the levitation of the rotor during operation thereby minimizing friction and allowing very high rotational speed.

Another advantage of the present invention is the capability to economically produce magnetic micromotors and micropumps on a mass scale using known microfabrication techniques.

Other objects, features, and advantages of the present invention will become apparent from the following description when considered in conjunction with the accompanying drawings.

BRIEF DESCRIPTION OF THE DRAWINGS

This invention, as defined in the claims, can be better understood with reference to the following drawings. The drawings are not necessarily to scale, emphases instead being placed upon clearly illustrating principles of the present invention.

DETAILED DESCRIPTION OF THE PREFERRED EMBODIMENT

Figure 1:
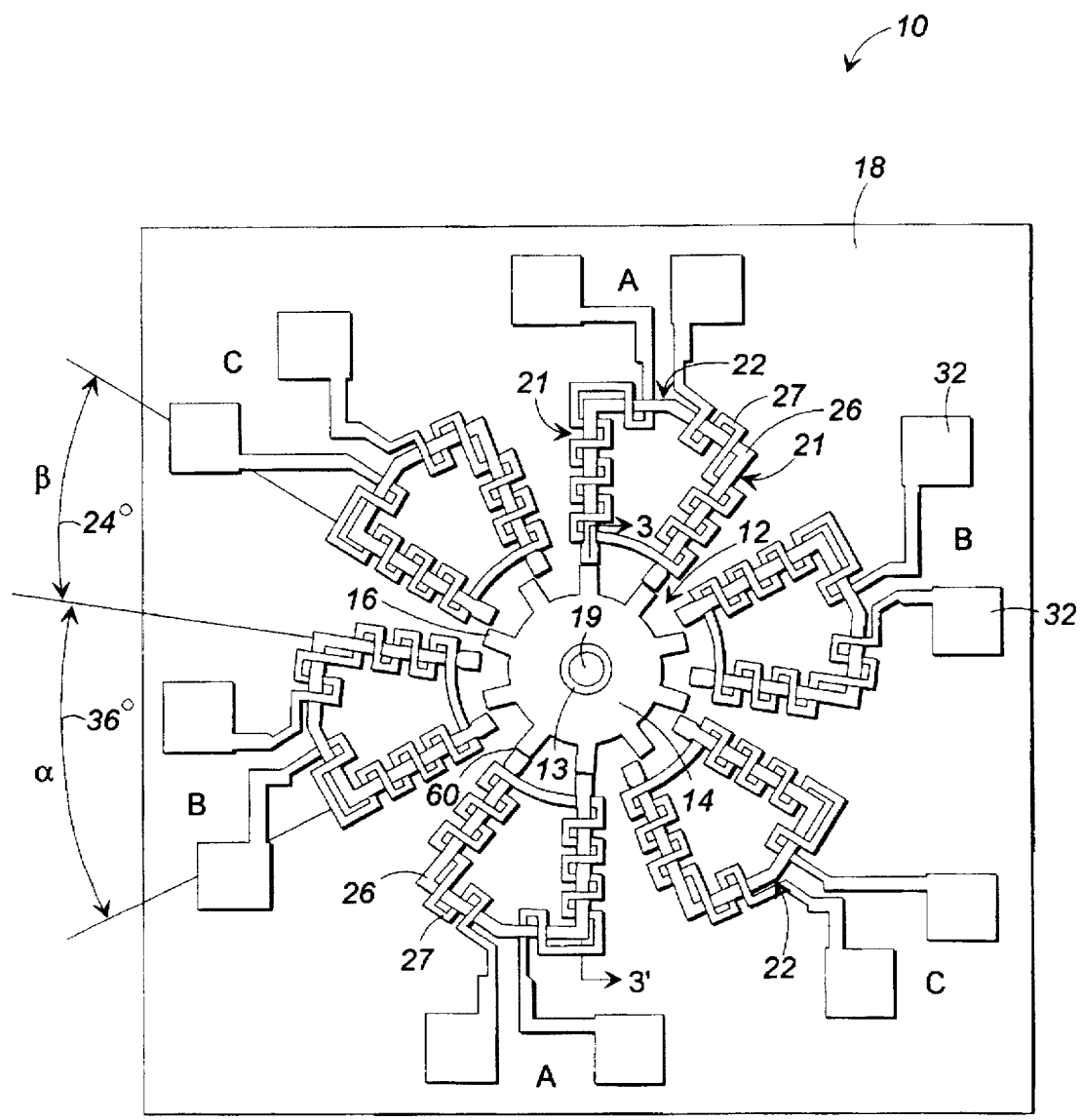
FIG. 1 is a top plane view of a planar fully integrated magnetic micromotor in accordance with the present invention.

With reference to the drawings wherein like reference numerals represent corresponding parts throughout the several views, FIG. 1 illustrates a top plan view of the planar fully integrated variable reluctance magnetic micromotor 10 in accordance with the present invention. Because micromotor 10 is fully integrated and fabricated using conventional photolithography techniques, it is capable of being mass produced economically and is particularly suited for application as a micropump.

Figure 2:
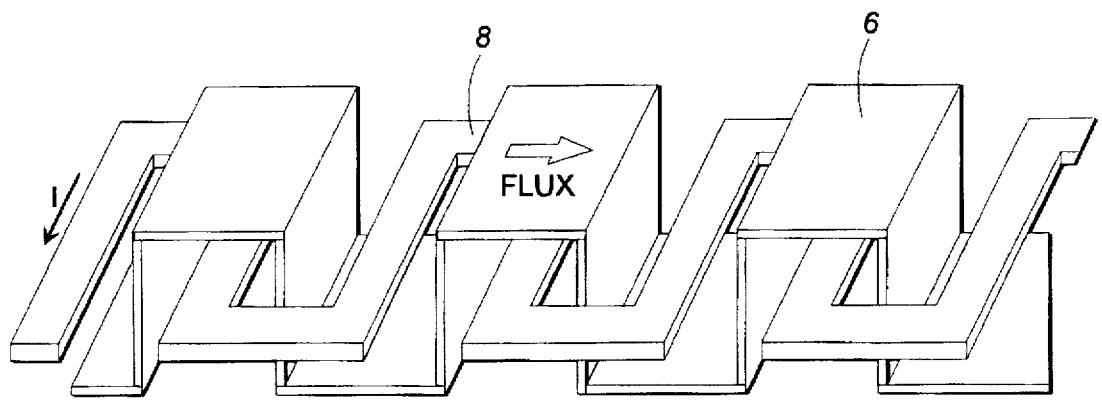
FIG. 2 is a schematic diagram of an integrated torodial-meander type inductor utilized in the magnetic micromotor of FIG. 1.

Incorporated in micromotor 10 are several features proposed and demonstrated in the article by Ahn et al. such as a torodial-meander type inductor and a novel stator configuration. In regard to the torodial-meander type inductor Ahn et al. teaches a multilevel magnetic core 6 wrapped around a planar meander conductor 8, as shown in FIG. 2. This configuration makes it possible to guide the magnetic flux confined in an integrated magnetic core to the location where the magnetic actuation or sensing takes place (i.e., the end portions of the core adjacent the rotor). Several advantages inherent with such a design are that the length of the conductor necessary to achieve the same number of turns is shorter than that of conventional spiral conductors which results in a smaller conductor series resistance, the linkage flux is relatively low since the magnetic cores are tightly linked with the conductor coils which results in relatively high inductance, and the magnetic core is produced on two levels making it relatively available for surface micromachining of movable core actuators (i.e. the rotors).

In regard to the novel stator geometry taught in Ahn et al., the conventional yoke configuration is removed. In order to reduce core reluctance, the length of the magnetic cores is reduced by arranging the stator poles in pairs to achieve adjacent pole paths of shorter lengths. This greatly shortens the magnetic flux paths and provides an isolated magnetic core for the flux path of each phase. As a result, the isolated magnetic circuit reduces the core reluctance by 50 percent. This is an important factor in the fabrication of micromechanical magnetic circuits in that the reluctance of the core in many magnetic micromotors is comparable to the reluctance of the air gap.

Referring to FIG. 1, micromotor 10 has a rotor 12 with a hole 13 longitudinally through its center. Rotor 12 has a circular body 14 with substantially rectangular elements radially extending therefrom forming rotor poles 16. It is well known by those in the art that the rotor 12 may take on a geometry other than that used for the purposes of illustrating the present invention, and likewise, the rotor 12 may have a different number of poles 16 than that illustrated with the present invention. It is relevant to note that several aspects of the micromotors performance are depended upon the number of rotor poles. For instance, the fundamental switching frequency necessary to rotate a rotor at a speed n (rev./sec.) is given by equation (1) as:

$$f = nN_r \quad (1)$$

where $N_r$ is the number of rotor poles. If a micromotor has q phases, then $qN_r$ steps are required for a single revolution and the stroke, also referred to as the step angle, is given by equation (2) as:

$$S = \frac{2\Pi}{qN_r} \text{ (rad)}. \quad (2)$$

Shown in Table I below are possible combinations of the number of rotors and stators and the corresponding amount of rotation per stroke for a magnetic micromotor in accordance with the present invention. For example, a micromotor such as the one illustrated in the preferred embodiment of the present invention has 12 stator poles and 10 rotor poles (12/10) in 3 phases (as opposed to a conventional 12 stator pole /8 rotor pole design), and has 12° of rotation per stroke. As shown in FIG. 1, two stator pole pairs in the same phase are located in the opposite direction through rotor poles, where each stator pole pair contains 7 turns of torodial-meander coil. The angle between rotor poles is 36°, the angles between stator poles are 36° for those located in the same phase and 24° for those located in the adjacent phase respectively. The required strokes per revolution with this configuration is 30.

POSSIBLE ROTOR/STATOR POLE COMBINATIONS FOR THE PRESENT INVENTION

TABLE I

| Number of phases | Stator/rotor poles | Strokes per rotation | Rotor angle α (degree) | Stator angles α/β (degree) | Rotation per stroke (degrees) |
|---|---|---|---|---|---|
| 2 | 4/3 | 6 | 120 | 120/60 | 30 |
| 3 | 6/5 | 15 | 72 | 72/48 | 24 |
| 3 | 12/10 | 30 | 36 | 36/24 | 12 |
| 4 | 16/14 | 48 | 25.7 | 25.7/38.6 | 19.3 |
| 5 | 10/9 | 45 | 40 | 40/32 | 16 |

Figure 3:
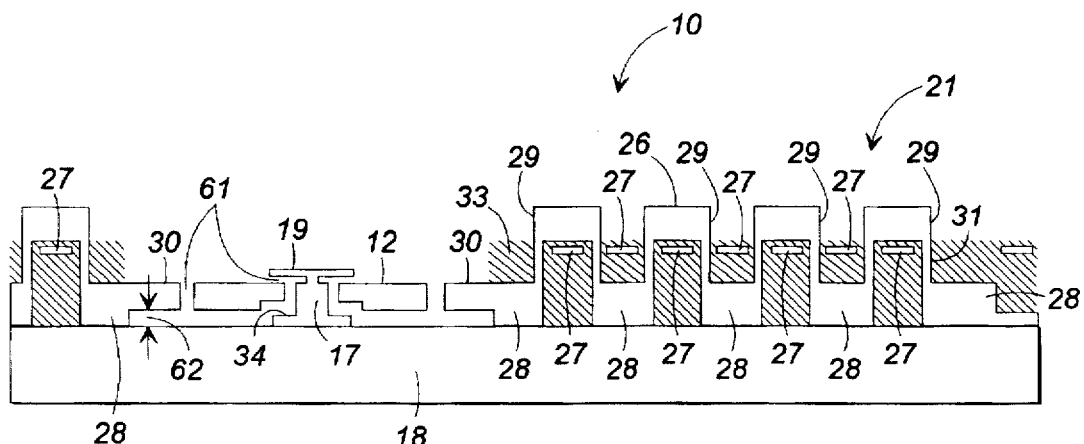
FIG. 3 is a cross-sectional view of the present invention taken along line 3'—3' of FIG. 1.

Referring to FIGS. 1 and 3, rotor 12 rotates about pin 17. Pin 17 extends outward from substrate surface 18 and is cylindrical in shape. Pin 17 is mated with rotor 12 through rotor hole 13 so that rotor 12 is movable and can freely rotate about pin 17 in a circular fashion. Disposed at the distal end of pin 17 is rotor cap 19. Rotor cap 19 prevents rotor 12 from becoming dislodged from micromotor 10. Furthermore, rotor cap 19 allows micromotor 10 to operate in either an upright or inverted attitude.

As best shown in FIG. 1, circumferentially spaced around rotor 12 are stator coils comprising stator poles 21 configured in stator pole pairs 22. Adjacent stator pole pairs 22 are circumferentially spaced at an angle β, β being approximately 24° in the preferred embodiment chosen for the purpose of illustrating the present invention. Alternatively, stator poles 21 comprising stator pole pair 22 are spaced apart at an angle α, α being approximately 36° in the embodiment chosen for the purpose of illustrating the present invention. Note that angles β and α are depended upon the number of stator and rotor poles, as indicated in Table I hereinbefore. Additionally, opposing stator pole pairs 22 comprise a single phase, denoted in FIG. 1 as A, B, and C. Thus, as the phases are sequentially energized, each change in phase results in rotor 12 moving one stroke.

As shown in FIGS. 1 and 3, each stator pole 21 comprises a core 26 and conductor 27. The core 26 is a multilevel structure including a first layer 28 adjacent to substrate base 18 and a second layer 29 spaced from substrate 18 and connected to first layer 28 by via cores 31. The meander type conductor 27 is planar and is wrapped around core 26. Such a design allows the fabrication of the integrated stator poles 21. Thus, the fully integrated stator poles 21 eliminates the need for permanent magnetic components or the introduction of external magnetic fields on the moving parts. Furthermore, the magnetic flux confined at the core can be guided to the exact points which require the magnetic flux or forces for causing movement in rotor 12. The ends of conductor 27 are attached to bonding pads 32 adapted for connection to a power source, not shown. As illustrated in FIG. 3, a polyamide layer 33 is integrated about core 26, insulating conductor 27.

In operation, a power source connected to all the bonding pads 32 selectively induces a current simultaneously through conductor 27 of a first stator pole pair 22 and a second stator pole pair 22 which is of the same phase and disposed opposite the first stator pole pair. Note, however, a single phase can comprise a single stator pole pair 22 or multiple stator pole pairs 22, depending upon various design considerations and the particular application. The magnetic flux in cores 26 created by the current through conductors 27 attracts the nearest rotor poles 16 into alignment with the stator poles 21 of the excited stator pole pairs 22, thereby causing rotor 12 to rotate one stroke, approximately 12° of rotation in the embodiment illustrated. The excited phase of pole pairs 22 is switched off and the next two adjacent stator pole pairs 22 in phase with one another are induced with current in a similar manner, thus causing rotor 12 to rotate so as to align the closest rotor poles 16 with the stator poles 21 of the subsequent two stator pole pairs being excited. In a sequential fashion, opposing stator pole pairs 22 in the same phase are excited so as to cause rotor 12 to rotate about pin 17 in either a synchronous or asynchronous (stepping) fashion. By changing the frequency and phase ruing order of the power source, the speed and direction of rotation of rotor 12 can be altered.

Rotation of rotor 12 can be initiated by applying 3 phase current pulses as little as 200 mA with less than a 1 volt driving voltage. The maximum current the stator poles 21 can withstand is approximately 2.5 A to 3 A. If continuous current exceeding 4 amperes is induced, failure of stator poles 21 is probable. It is predicted that the torque of micromotor 10 with a 500 mA driving current is 3.3. nN-m.

Equation (3) below is an equation that can be used to predict the maximum torque attained by micromotor 10:

$$T = (\text{rotor volume}) \frac{N_r \beta^2 s (\lambda - 1) 9 \beta g}{2\pi \mu_o r_1} \, Nm \quad (3)$$

where $N_r$ is the number of rotor poles, $\beta_s$ is the magnetic flux density in the stator poles at the maximum flux linkage in the aligned position, $\lambda$ is the aligned/unaligned unsaturated inductance ratio, $\beta$ is the pole arc, and g is the air gap distance.

Referring to FIG. 3, the end portions 30 of core 26 all are spaced from substrate base 18 a predetermined distance 62 so that when stator pole pairs 22 are energized, the resulting inductance causes rotor poles 16 to horizontally align with stator poles 21, levitating rotor 12 so as to substantially eliminate contact with rotor supporter 34, thereby reducing the frictional contact of rotor 12 with substrate 18 and rotor support 34, and thereby enabling rotor 12 to rotate at a speed of approximately 50,000 rotations per minute (rpm). Further, the air gaps 61 between the distal ends of rotor poles 16 and the end portions 30 of stator poles 21 are also critical to the performance of micromotor 10. This is important because narrow air gaps 61 usually provide higher torques with a lower current, and uniform air gaps 61 give a smooth and stable operation of micromotor 10. Consequently, it is essential that rotor 12 be fabricated in a manner so that air gaps 61 are as small as possible and uniform in order to achieve acceptable performance.

Figure 4A:
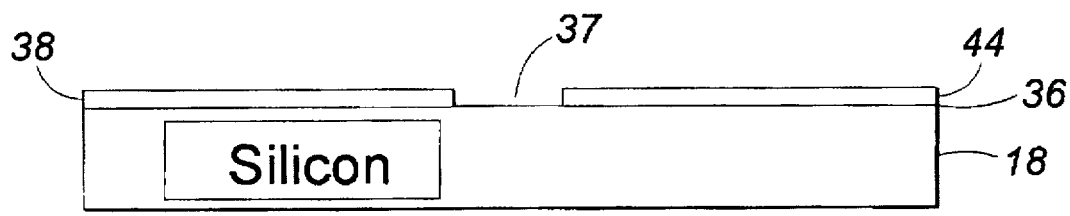
FIGS. 4A–4M are cross-sectional views illustrating the steps employed in fabricating the preferred embodiment of the present invention.
Figure 4B:
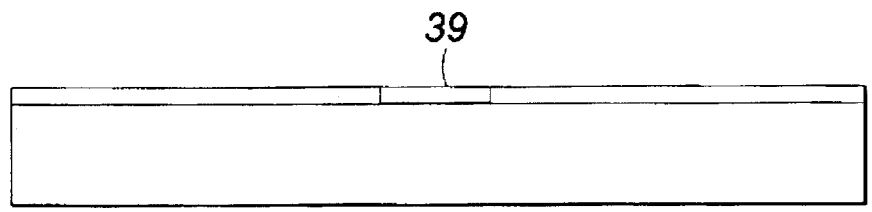

A method of fabricating the planar fully integrated variable reluctance magnetic micromotor 10 in accordance with the present invention is described by reference to FIGS. 4A–4M. The fabrication process begins with a silicon wafer for the substrate base 18, on which is deposited a 0.6 μm layer 36 of PECVD silicon nitride. Onto the silicon nitride layer 36, an electroplating seed layer 44 comprising chromium/copper/chromium layers are deposited using electron-beam evaporation. Thereafter, multiple coats of polyamide are spun onto the substrate 18 to an approximate thickness of 40 μm. Each coat of polyamide is cast by continuous two-step spin seeds; 700 rpm for 10 seconds then 3,000 rpm for 4 seconds, then soft baked for 10 minutes at 120° C. prior to the application of the next coat. The polyamide layer 38 is then cured at 350° C. for one hour in nitrogen, yielding an after-cured thickness of 40 μm. A form 37 is then etched in the polyamide layer 38 using a 5% $CF_4/O_2$ plasma etch and an aluminum hard mask until the chrome/copper/chrome seed layer 44 is exposed, as shown in FIG. 4A. The electroplating form 37, which will form rotor pin support 39, is then fried with nickel (81%) - iron (19%) permalloy using standard electroplating techniques and a nickel-iron electroplating bath as described in Table II below. Refer to FIG. 4B. When electroplating the rotor pin support 39, an electrical contact

NICKEL-IRON AND COPPER ELECTROPLATING BATH COMPOSITIONS

TABLE II

| Nickel-iron | | Copper | |
|---|---|---|---|
| Component | Quantity (g/l) | Component | Quantity |
| $NiSO_4.6H_2O$ | 200 | $CuSO_4.5H_2O$ | 1200 (g/l) |
| $FeSO_4.7H_2O$ | 8 | $H_2SO_4$ | 100 (ml/l) |
| $NiCl_2.6H_2O$ | 5 | | |
| $H_3BO_3$ | 25 | | |
| Saccharin | 3 | | | is made with the seed layer 44 as the substrate base 18 is immersed in the plating solution, not shown. During the electroplating step, the solution is maintained at room temperature with a pH of approximately 2.7, and is stirred very slowly with a Teflon propeller blade. An applied current density of approximately 2 mA/cm² results in an electroplating rate of 0.1–0.15 82 m/minute. The polyamide layer 38 is then removed producing a rotor pin support 39, as illustrated in FIG. 4B.

Figure 4C:
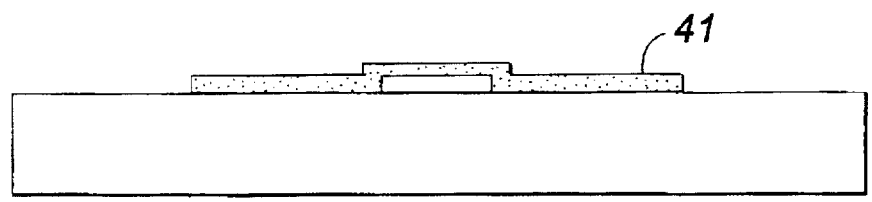
Figure 4D:
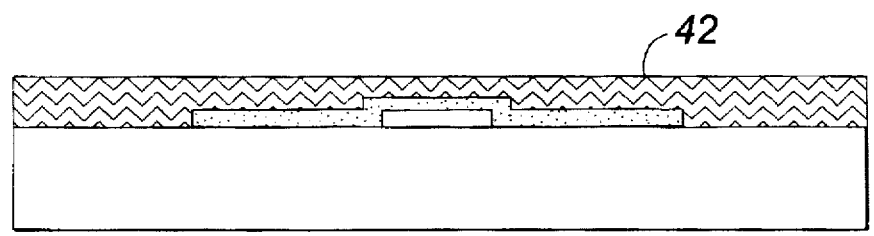
Figure 4E:
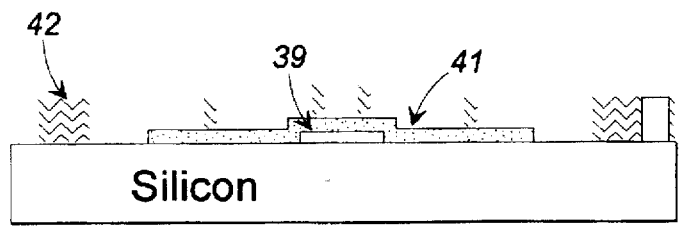
Figure 4F:
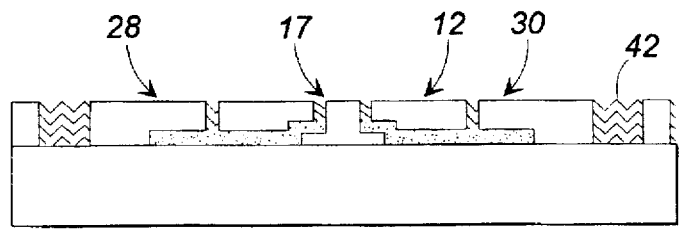

Using the techniques described above, a sacrificial layer 41 of copper is formed over rotor pin support 39 and a portion of substrate base 18, as illustrated in FIG. 4C. A layer 42 of photosensitive polyamide is then cast on the substrate in multiple coats so as to build up the layer 42 to a predetermined thickness. Electroplating molds for the first core layer 28, rotor 12, and pin 17 are then etched into the polyamide layer, as shown in FIG. 4E. The electroplating molds are then fried with nickel/iron permalloy, as shown in FIG. 4F. After removing photosensitive polyamide layer 42 residing in gaps 61 between rotor 12 and pin 17 and between rotor 12 and end portion 30 of core 26, a sacrificial copper layer is electroplated to fill gaps 61, not shown.

Figure 4G:
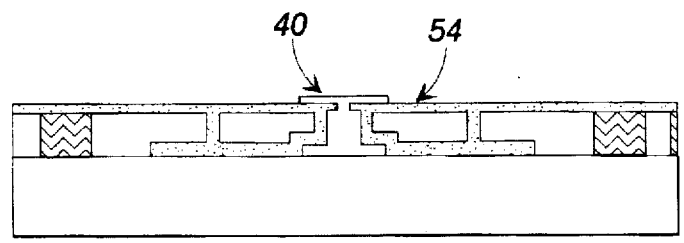
Figure 4H:
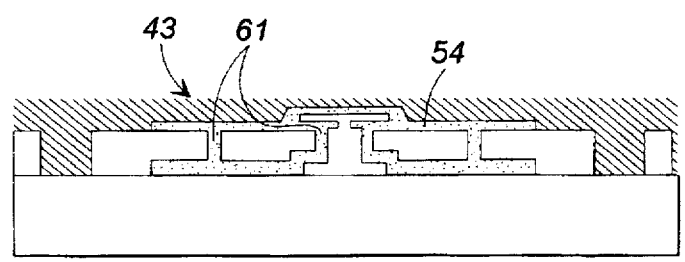
Figure 4I:
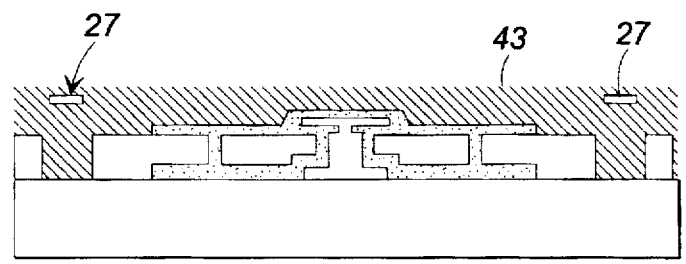
Figure 4J:
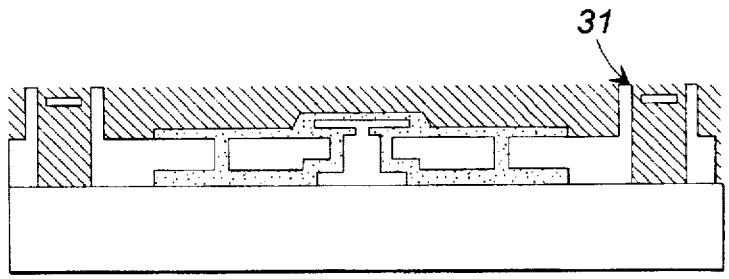

A rotor cap 40 is then electroplated onto pin 17 after etching the copper layer to make a through hole for contact between rotor cap 40 and pin 17, as shown in FIG. 4G. A second copper layer 54 is deposited so as to only cover rotor cap 40, rotor 12, and core end portions 30, as shown in FIG. 4H. The remaining portion of polyamide layer 42 is removed at the same time.

In order to insulate magnetic core 26 from conductor 27, polyamide is spin coated with two step speeds and hard cured at 350° C. for one hour to form polyamide layer 43, as shown in FIG. 4H.

Figure 4K:
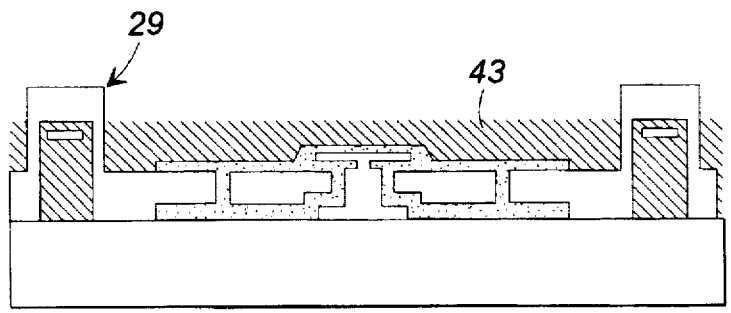
Figure 4L:
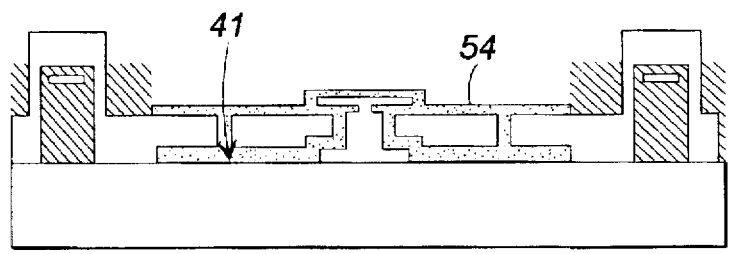
Figure 4M:
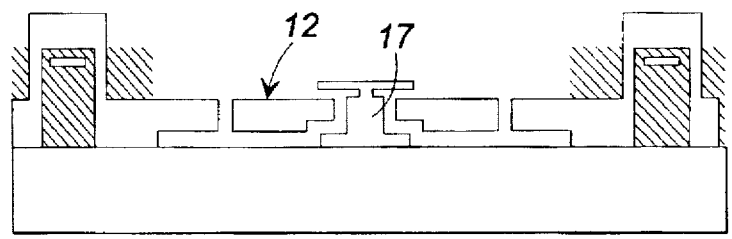

To construct the planar meander conductor 27, a seed layer of chromium/copper/chromium is deposited in the conductor forms, not shown, etched in polyamide layer 43. Conductor 27 is then plated using the electroplating techniques disclosed hereinbefore in conjunction with a copper plating solution such as that described in Table II. Please refer to FIG. 4I. Forms for via cores 31 are then formed in polyamide layer 43 and electroplated in the manner set forth above and illustrated in FIG. 4J. The second layer 29 of core 26 is subsequently electroplated so as to make core 26 continuous, as shown in FIG. 4K. Sacrificial layer 43 of polyamide and copper layers 41 and 54 are subsequently removed by dry etching, releasing rotor 12 so as to be freely moveable about pin 17.

Worth noting at this point is that because rotor 12 is fabricated adjacent silicon wafer 18, a very smooth surface, the geometry of rotor 12 can be precisely controlled in fabrication so that the gaps 61 between the rotor 12 and pin 17 as well as between the rotor poles 16 (FIG. 1) and the end portions 30 (FIG. 3) of core 26 are uniform and of optimal size. This is critical in the operation of micromotor 10 because if the gap between rotor 12 and pin 17 does not have adequate separation, rotor 12 will be tilted and touched to substrate 18, preventing its rotation due to high friction. In the similar way, if the gap between the rotor poles 16 and the end portions 30 of core 26 are not adequate, micromotor 10 performance's will be seriously affected and distorted. Thus, by controlling with exactitude the dimensions of the electroplating molds for rotor 12 and pin 17 etched into polyamide layer 42 (FIG. 4E), micromotor 10 is provided with more flexible design, fabrication and operation.

Figure 5:
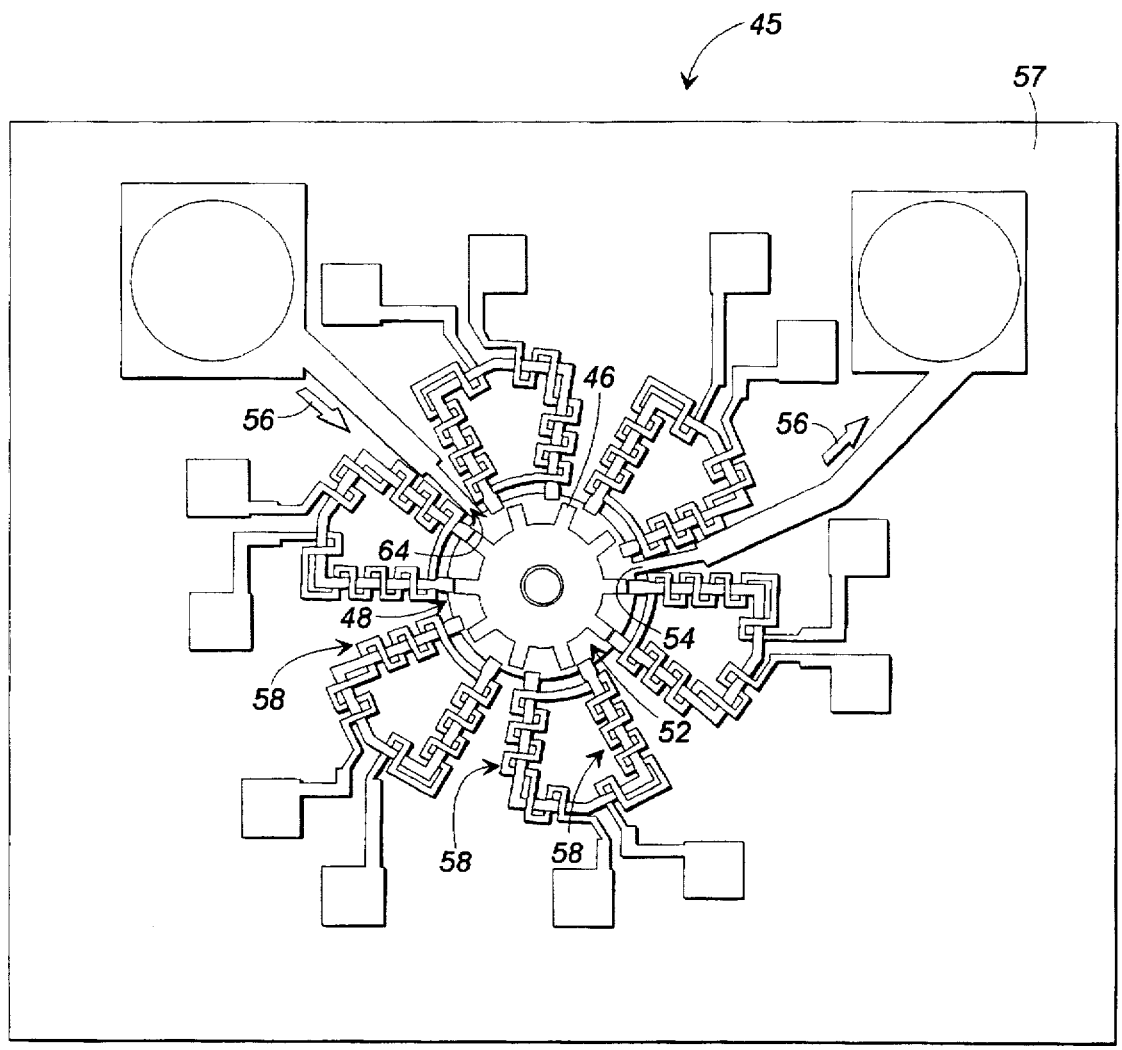
FIG. 5 is a top plane view of an alternative embodiment of the present invention adapted for use as a pump for conductive fluids.

Another embodiment of the present invention is a micropump 45 as shown in FIG. 5. In biomedical, biological, or chemical fluid system applications, there has been a large demand for a micro-fluid control system with fluid driving as well as flow sensing functions, allowing control of small amounts of fluid. Micropumps are an essential component in constructing the total fluid control system. Specific applications, such as drug delivery systems, require sophisticated fluid control, i.e., a smooth fluid flow as well as a fast response time. The planar rotary fluid micropump 45 has a similar operation mechanism to the conventional rotary pump though is implemented with a micromotor of the present invention. Planar magnetic micromotor 45 allows the concept of the microturbine to be reversed that is, to realize a rotary fluid micropump by driving a rotor in a fluid. As shown in FIG. 5, a rotary micropump traps the liquid in the spaces between the rotor poles 46, pushing it around the closed housing 48. It is then carded around by the rotation of the rotor 52 and squeezed out through an outlet 54. This operation mechanism has the potential for very smooth fluid delivery in either direction. Since this micropump is driven by a magnetic micromotor, the rotor speed of this pump can be widely and continuously controlled by adjusting the excitation frequency of the stator coils 58. Since the magnetic micromotor can provide functional actions such as stepping, continuous, forward, and backward operations, a fluid jet-injection by forward driving as well as an abrupt stopping of jet-injection by backward driving can be easily achieved. Thus, these functional jet actions will provide a favorable dynamic fluid control for a ink jet printer as well. Of course, fluid flow can be produced in either forward or backward direction depending on the rotation direction of rotor 52, which also allows a micropump 45 to produce hi-directional fluid flows.

Many biomedical, biological, and chemical fluids are conductive, which limits the driving principles available to drive the fluids. A magnetic drive allows the pumping of conductive fluids without inducing any electrical breakdown, if the conductor used to generate the magnetic flux are properly insulated from the exposed fluid. One advantage of magnetic micromotor 45 is that due to the nature of the fabrication process, the conductor lines 62 are buried in insulating polymer layer, thus realizing the required insulation.

In micropump 45, rotor 52 plays two roles: a magnetic component for the micromotor as well as a mechanical component for the pump. Similarly, the salient poles of the rotor not only provide the required variable reluctance, but also generate fluid flow as a mechanical 'bucket' for the rotary micropump. In micropump 45, rectangular-type salient poles 46 of rotor 52 are adopted for the hi-directional flow driving, but an arcuate or shape salient pole can also be used for a better performance as a pump, depending on the application. Further, rotor 51 is especially adapted to operating in a micropump in that rotor 51 is contiguous substrate surface 57 so that there is essentially no fluid flow beneath rotor 51. This enables micropump 45 to operate at a level of extreme efficiency and accuracy.

As described earlier, the rotary micropump combines the constant discharge characteristic of the centrifugal-type with the positive discharge feature of the reciprocating-type pump. As rotor 52 turns in a clockwise direction, fluid trapped between the rotor poles 46 and the housing 48 is carded from the inlet 64 to the outlet 54, in the direction indicated by arrows 56. Hence, a variable-delivery pump is considered, since the fluid volume displacement depends on the revolution of rotor 52. Pumping operating speeds are increasing as the pressure ratings go up and the volumetric capacities decrease. When the rotor rotates with N (rpm), then the fluid displacement is expressed by equation (4) below as:

$$V_d = qV_1 N \qquad (4)$$

where q is total trap number exist at the rotor and $V_1$ is the fluid volume trapped between a rotor pole 46 pair and housing 48. When micropump 45 is driven at 5,000 rpm, the attainable flow rate is approximately 24 µl/min. If the torque generated from micropump 45 is kept at a constant value during pumping, the developed pressure at the outlet is defined by equation (5) below as:

$$P_a = C \frac{T_q N}{V_d} \qquad (5)$$

where C is a constant, $T_q$ is the micromotor torque, and the pump overall efficiency is assumed 100%. The achievable differential pressure between inlet 64 and outlet 54 is approximately 100 hPa. An inlet flow channel 52 and an outlet flow channel 53 provide means for introducing fluid into the pump and removing the fluid after being acted upon by rotor 51. Attached to inlet flow channel 52 and outlet flow channel 53 are pipes 54.

It would be obvious to those skilled in the art that modifications or variations may be made to the preferred embodiment described herein without departing from the novel teachings of the present invention. All such modifications and variations are intended to be incorporated herein and within the scope of the following claims.

Wherefore, the following is claimed:

1. A fully integrated variable reluctance magnetic micromotor, comprising:

a substrate base;

a pin fixed to said base and extending in a direction substantially normal thereto;

a rotor having a plurality of rotor poles radially extending therefrom, said rotor formed in place about said pin, said rotor rotatable about said pin, said rotor surrounded by a gap;

a rotor cap coupled to the distal end of said pin for securing said rotor;

a stator including a plurality of stator poles formed on said base and circumferentially arranged about said rotor;

said poles of said stator configured in pairs electrically connected, each pair of said poles comprising a multilevel core interleaved with a planar meander conductor;

a plurality of bonding pads formed on said base and connected to said planar meander conductors, said pads adapted for connection to a power source, and wherein said rotor is on a first level of said multilevel core, said first level adjacent to said substrate base.

2. The micromotor of claim 1, wherein said conductor and said rotor are disposed in separate levels of said multilevel core.

3. The micromotor of claim 1, wherein said rotor is on said first level with an end portion of said core.

4. The micromotor of claim 1, wherein said rotor has fewer poles than said stator.

5. The micromotor of claim 1, wherein each said rotor pole is spaced from adjacent rotor poles by a first angle, said stator poles of each respective said pair of stator poles are spaced apart by said first angle, and wherein each said pair of stator poles is spaced from adjacent pairs of stator poles by a second angle.

6. A fully integrated variable reluctance magnetic micromotor, comprising:

a substrate base;

a pin fixed to said base and having a central axis;

a rotor having a plurality of rotor poles and rotatably mated to said pin for rotating about said axis of said pin, said rotor being fabricated in place, contiguous to said substrate base, said rotor surrounded by a gap;

a stator having a plurality of stator poles circumferentially arranged about said rotor in pairs, each pair of said stator poles including a multilevel core wrapped around a planar conductor; and wherein said rotor is on a first level of said multilevel core, said first level adjacent to said substrate base.

7. A variable reluctance magnetic micropump, comprising:

a substrate base;

a pin fixed to said base and having a central axis;

a rotor having a plurality of rotor poles and rotatably mated to said pin for rotating about said axis of said pin, said rotor being fabricated in place, contiguous to said substrate base, said rotor surrounded by a gap;

a stator having a plurality of stator poles circumferentially arranged about said rotor in pairs, each pair of said stator poles including a multilevel core wrapped around a planar conductor;

means for encasing said rotor;

an inlet flow channel coupled to said encasing means;

an outlet flow channel coupled to said encasing means; and wherein said rotor is on a first level of said multilevel core, said first level adjacent to said substrate base.

8. The magnetic micromotor of claim 7, wherein said rotor poles include an arcuate portion adapted for facilitating the flow of fluids.

* * * * *

UNITED STATES PATENT AND TRADEMARK OFFICE
CERTIFICATE OF CORRECTION

Page 1 of 2

PATENT NO. : 5,710,466
DATED : January 20, 1998
INVENTOR(S) : Allen et al.

It is certified that error appears in the above-identified patent and that said Letters Patent is hereby corrected as shown below:

Column 1, line 67, before "magnetic" insert --a--; and before "micromotor", delete "a".
Column 2, line 25 change "mason" to --reason--.
Column 2, line 37, change "heroin" to --herein--.
Column 2, line 49 change "beating" to --bearing--.
Column 4, line 8 change "ruing" to --firing--.
Column 4, line 14, after "poles" insert --and--.
Column 5, line 38, change "depended" to --dependent--.
Column 7, line 11 change "ruing" to --firing--.
Column 7, line 15, after "pulses" insert --of--.
Column 7, line 60, change "seeds" to --speeds--.
Column 8, line 2 change "fried" to --filled--.
Column 8, line 38 change "fried" to --filled--.
Column 8, line 60, delete "via".
Column 9, line 11, before "similar", delete "the" and insert therefore --a--.
Column 9, line 17, before "more" insert --a--.
Column 9, line 29, after "though" insert --it--.
Column 9, line 47, before "ink", delete "a" and insert therefore --an--.
Column 9, line 51 change "hi-directional" to --bi-directional--.
Column 9, line 56, change "conductor" to --conductors--.
Column 9, line 60, after "in" insert --an--.
Column 10, line 1 change "hi-directional" to --bi-directional--.

UNITED STATES PATENT AND TRADEMARK OFFICE
CERTIFICATE OF CORRECTION

PATENT NO. : 5,710,466
DATED : January 20, 1998
INVENTOR(S) : Allen *et al.*

It is certified that error appears in the above-identified patent and that said Letters Patent is hereby corrected as shown below:

Column 10, line 3, after "for" delete "a".
Column 10, line 14 change "carded" to --carried--.
Column 10, line 33 change "Pα" to --Pa --.

Signed and Sealed this

Nineteenth Day of May, 1998

*Attest:*

BRUCE LEHMAN

*Attesting Officer*  Commissioner of Patents and Trademarks